(12) United States Patent
Riley et al.

(10) Patent No.: US 11,115,950 B2
(45) Date of Patent: Sep. 7, 2021

(54) LOCATION SERVICES USING MULTIPLE LIGHT FIXTURES

(71) Applicant: SIGNIFY HOLDING B.V., Eindhoven (NL)

(72) Inventors: Peyton Riley, Suwanee, GA (US); Russell Scott Trask, Sharpsburg, GA (US); Babu Papanna, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/283,437

(22) Filed: Feb. 22, 2019

(65) Prior Publication Data

US 2019/0261301 A1 Aug. 22, 2019

Related U.S. Application Data

(60) Provisional application No. 62/633,965, filed on Feb. 22, 2018.

(51) Int. Cl.
| | |
|---|---|
| *H04W 64/00* | (2009.01) |
| *H04W 4/02* | (2018.01) |
| *H04B 17/318* | (2015.01) |
| *H04W 4/80* | (2018.01) |
| *G04D 7/06* | (2006.01) |

(Continued)

(52) U.S. Cl.
CPC ............. *H04W 64/00* (2013.01); *G01S 5/14* (2013.01); *G01S 5/16* (2013.01); *G05D 7/0664* (2013.01); *H04B 17/318* (2015.01); *H04W 4/023* (2013.01); *H04W 4/80* (2018.02)

(58) Field of Classification Search
CPC ....... H04W 64/00; H04W 4/023; H04W 4/80; H04B 17/318; G05D 7/0664; G01S 5/16; G01S 5/14; G01S 5/00
USPC .... 455/115.3, 134, 161.3, 226.2, 456.1–457, 455/513
See application file for complete search history.

(56) References Cited

U.S. PATENT DOCUMENTS

| | | |
|---|---|---|
| 2013/0170374 A1 | 7/2013 | Aljadeff |
| 2016/0286624 A1* | 9/2016 | Patel .................. H05B 37/0218 |

(Continued)

FOREIGN PATENT DOCUMENTS

WO WO 2015/065317 5/2015

OTHER PUBLICATIONS

International search report for PCT/EP2019/025048, dated May 28, 2019.

*Primary Examiner* — Michael Y Mapa

(57) ABSTRACT

A system can include an object having a communication device, where the communication device of the object broadcasts a first signal from a first location within a volume of space at a first time. The system can also include a first electrical device and a second electrical device that receives the first signal in the volume of space. The system can also include a controller communicably coupled to the first electrical device and the second electrical device, where the controller determines a first strength of the first signal received by the first receiver, determines a second strength of the first signal received by the second receiver, scales the first signal relative to the second signal based on the first strength and the second strength, and determines a location of the object in the volume of space based on scaling the first signal relative to the second signal.

16 Claims, 11 Drawing Sheets

(51) Int. Cl.
*G01S 5/14* (2006.01)
*G01S 5/16* (2006.01)
*G05D 7/06* (2006.01)

(56) References Cited

U.S. PATENT DOCUMENTS

2017/0039516 A1* 2/2017 Amann ............... H04B 17/318
2018/0007652 A1* 1/2018 Sharma ............... H04B 17/318
2018/0188018 A1* 7/2018 Brown ................. H05B 45/357

* cited by examiner

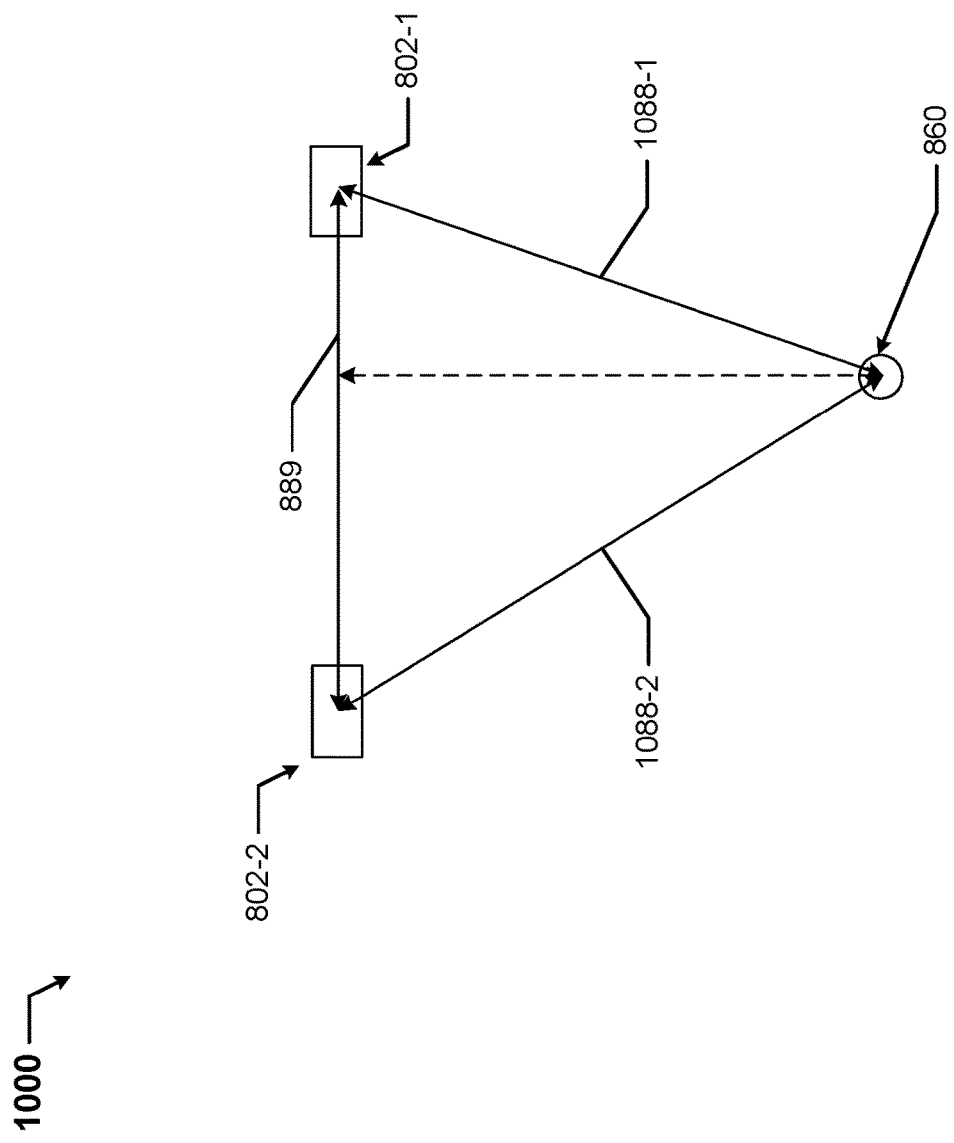

LOCATION SERVICES USING MULTIPLE LIGHT FIXTURES

CROSS-REFERENCE TO RELATED APPLICATIONS

This application claims priority under 35 U.S.C. § 119 to U.S. Provisional Patent Application Ser. No. 62/633,965, titled "Location Services Using Multiple Light Fixtures" and filed on Feb. 22, 2018, the entire contents of which are hereby incorporated herein by reference.

TECHNICAL FIELD

Embodiments described herein relate generally to locating objects in a space, and more particularly to systems, methods, and devices for locating objects in a space using light fixtures and/or other electrical devices.

BACKGROUND

Different methods are used to locate an object within a volume of space. Typically, when signals are involved, the angle of arrival (AoA) and/or the Angle of Departure (AoD) of each signal can be measured to help determine the location of an object within a volume of space. Regardless of the locating method in use, a considerable amount of processing effort is currently put into using readings of multiple (often three or more) measurement points to determine the precise location of an object.

SUMMARY

In general, in one aspect, the disclosure relates to a system that can include an object having a communication device, where the communication device of the object broadcasts a first signal from a first location within a volume of space at a first time. The system can also include a first electrical device disposed in the volume of space and having a first antenna and a first receiver, where the first receiver, using the first antenna, receives the first signal. The system can further include a second electrical device disposed in the volume of space, where the second electrical device includes a second antenna and a second receiver, where the second receiver, using the second antenna, receives the first signal. The system can also include a controller communicably coupled to the first electrical device and the second electrical device. The controller can determine a first strength of the first signal received by the first receiver. The controller can also determine a second strength of the first signal received by the second receiver. The controller can further scale the first signal relative to the second signal based on the first strength and the second strength. The controller can also determine a location of the object in the volume of space based on scaling the first signal relative to the second signal.

In another aspect, the disclosure can generally relate to an electrical device among a plurality of electrical devices used to locate an object in a volume of space. The electrical device can include an antenna configured to receive a plurality of object signals broadcast by the object. The electrical device can also include a receiver coupled to the antenna. The electrical device can further include a controller coupled to the receiver, where the controller is configured to determine a strength of each object signal of the plurality of object signals received from the object. The strength of each object signal can be used by the controller to determine a location of the object in the volume of space.

These and other aspects, objects, features, and embodiments will be apparent from the following description and the appended claims.

BRIEF DESCRIPTION OF THE DRAWINGS

The drawings illustrate only example embodiments of location services using multiple light fixtures and are therefore not to be considered limiting of its scope, as location services using multiple light fixtures may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 8-10 show various examples of locating an object with multiple light fixtures in accordance with certain example embodiments.

DETAILED DESCRIPTION OF EXAMPLE EMBODIMENTS

Figure 1:
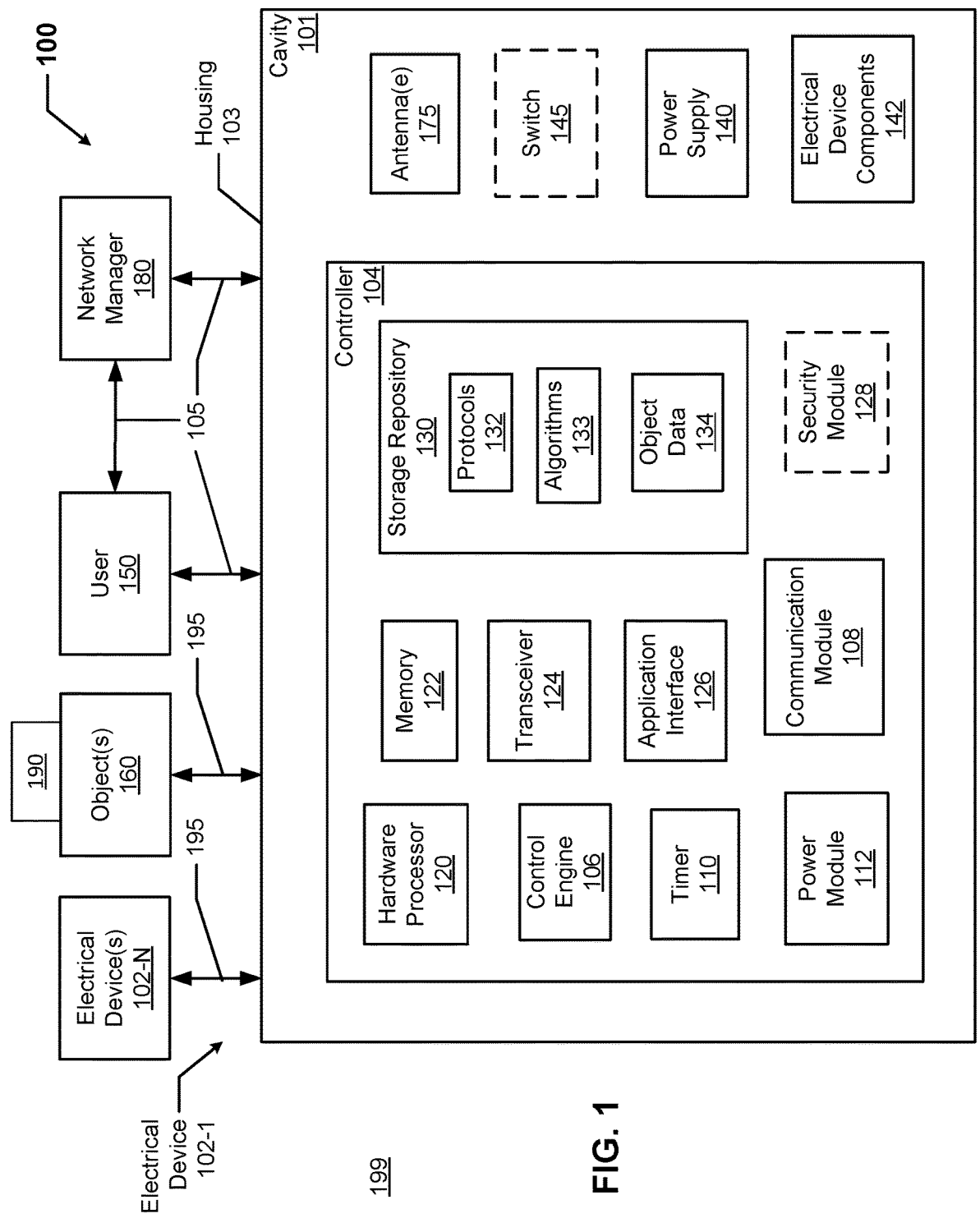
FIG. 1 shows a diagram of a system that includes an electrical device in accordance with certain example embodiments.

The example embodiments discussed herein are directed to systems, methods, and devices for location services using multiple light fixtures. While example embodiments are described herein as using light fixtures (or components thereof) to locate an object in a volume of space, example embodiments can use one or more of a number of other electrical devices in addition to, or as an alternative to, light fixtures. Such other electrical devices can include, but are not limited to, a light switch, a control panel, a wall outlet, a smoke detector, a $CO_2$ monitor, a motion detector, a broken glass sensor, and a camera.

Example embodiments can be used for a volume of space having any size and/or located in any environment (e.g., indoor, outdoor, hazardous, non-hazardous, high humidity, low temperature, corrosive, sterile, high vibration). Further, while signals described herein are radio frequency (RF) signals using Bluetooth Low Energy (BLE), example embodiments can be used with any of a number of other types of signals, including but not limited to WiFi, Bluetooth, RFID, ultraviolet waves, microwaves, and infrared signals. Example embodiments can be used to locate an object in a volume of space in real time.

Example embodiments of light fixtures described herein can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source.

A user may be any person that interacts with a light fixture and/or object in a volume of space. Specifically, a user may program, operate, and/or interface with one or more components (e.g., a controller, a network manager) associated with a system using example embodiments. Examples of a user may include, but are not limited to, an engineer, an electrician, an instrumentation and controls technician, a mechanic, an operator, a consultant, a contractor, an asset, a network manager, and a manufacturer's representative.

As defined herein, an object can be any unit or group of units. An object can move on its own, is capable of being moved, or is stationary. Examples of an object can include, but are not limited to, a person (e.g., a user, a visitor, an employee), a part (e.g., a motor stator, a cover), a piece of equipment (e.g., a fan, a container, a table, a chair, a computer, a printer), or a group of parts of equipment (e.g., a pallet stacked with inventory).

In certain example embodiments, light fixtures used for location of an object are subject to meeting certain standards and/or requirements. For example, the National Electric Code (NEC), the National Electrical Manufacturers Association (NEMA), the International Electrotechnical Commission (IEC), Underwriters Laboratories (UL), the Federal Communication Commission (FCC), the Bluetooth Special Interest Group, and the Institute of Electrical and Electronics Engineers (IEEE) set standards that can be applied to electrical enclosures (e.g., light fixtures), wiring, location services, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of location services using light fixtures will be described more fully hereinafter with reference to the accompanying drawings, in which example embodiments of location services using light fixtures are shown. Location services using light fixtures may, however, be embodied in many different forms and should not be construed as limited to the example embodiments set forth herein. Rather, these example embodiments are provided so that this disclosure will be thorough and complete, and will fully convey the scope of location services using light fixtures to those of ordinary skill in the art. Like, but not necessarily the same, elements (also sometimes called components) in the various figures are denoted by like reference numerals for consistency.

Terms such as "first", "second", "outer", "inner", "top", "bottom", "on", and "within" are used merely to distinguish one component (or part of a component or state of a component) from another. Such terms are not meant to denote a preference or a particular orientation, and are not meant to limit embodiments of location services using light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes multiple electrical devices 102 (e.g., electrical device 102-1, electrical devices 102-N) in accordance with certain example embodiments. The system 100 can include one or more objects 160, a user 150, and a network manager 180. At least the objects 160 and the electrical devices 102 are located in a volume of space 199. The electrical device 102-1 can include a controller 104, one or more antenna 175, an optional switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128. One or more of the components of the electrical device 102-1 can also be included in one or more of the other electrical devices 102-N in the system 100. Alternatively, a component (e.g., the controller 104) shown in FIG. 1 can be a stand-alone component.

The components shown in FIG. 1 are not exhaustive, and in some embodiments, one or more of the components shown in FIG. 1 may not be included in the example system 100. For instance, any component of the example electrical device 102-1 can be discrete or combined with one or more other components of the electrical device 102-1. For example, rather than one optional switch 145, there can be multiple optional switches 145. As another example, the optional switch 145 can be part of the controller 104.

The user 150 is the same as a user defined above. The user 150 can use a user system (not shown), which may include a display (e.g., a GUI). The user 150 interacts with (e.g., sends data to, receives data from) the controller 104 of an electrical device 102-1 via the application interface 126 (described below). The user 150 can also interact with a network manager 180 and/or one or more of the objects 160. Interaction between the user 150, the electrical device 102-1, and the network manager 180 is conducted using communication links 105. In some cases, the user 150, the electrical device 102-1, and/or the network manager 180 can also interact with the object 160 using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI) technology. For example, a communication link 105 can be (or include) one or more electrical conductors that are coupled to the housing 103 of a electrical device 102-1 and to the network manager 180. The communication link 105 can transmit signals (e.g., power signals, communication signals, control signals, data) between the electrical devices 102, the user 150, and the network manager 180. By contrast, the electrical devices 102 of the system 100 can interact with the one or more objects 160 using location signals 195, as discussed below. The one or more objects 160 can communicate with the user 150 and/or the network manager 180 using the communication links 105.

The network manager 180 is a device or component that controls all or a portion of the system 100 that includes the controller 104 of the electrical device 102-1 and the controllers of the other electrical devices 102-N. The network manager 180 can be substantially similar to the controller 104. Alternatively, the network manager 180 can include one or more of a number of features in addition to, or altered from, the features of the controller 104 described below.

The one or more objects 160 can be any of a number of people and/or devices, as described above. Each object 160 can include a communication device 190, which can send RF signals 195 to and/or receive RF signals 195 from the electrical devices 102. The communication device 190 can include one or more components (e.g., switch, antenna, transceiver) of an electrical device 102-1 and/or functionality described below with respect to a controller 104 of an electrical device 102-1. The RF signals 195 described herein can be transmitted in any of a number of ways, including BLE.

Using example embodiments, the communication device 190 (also sometimes called a beacon) of the object 160 can be in sleep mode until the communication device 190 receives a RF signal 195 broadcast by one or more antennae 175 of the electrical device 102-1. When this occurs, the communication device 190 can turn on long enough to interpret the initial RF signal 195, and then generate and send its own RF signal 195 to the electrical device 102-1 in response to the initial RF signal 195.

Alternatively, the communication device 190 of the object 160 can be in sleep mode until some pre-determined point in time (e.g., every hour, every 24 hours) that is independent of the antennae 175 of the electrical device 102-1 or RF signals 195 sent by the electrical device 102-1. When this occurs, the communication device 190 can turn on long enough to send a RF signal 195 to the electrical device 102-1 so that one or more of the antennae 175 of the electrical device 102-1 receive the RF signal 195. In any case, the RF signal 195 can include a UUID (or some other form of identification) associated with the object 160. Once the RF signal 195 is sent by the communication device 190 of the object 160, the communication device 190 can go back into sleep mode, thereby reserving a considerable amount of power.

The communication device 190 of the object 160 can use one or more of a number of communication protocols in transceiving (sending and/or receiving) RF signals 195 with the antennae 175 of the electrical device 102-1. In certain example embodiments, an object 160 can include a battery (a form of power supply or power module) that is used to provide power, at least in part, to some or all of the rest of the object 160, including the communication device 190.

In certain example embodiments, the communication device 190 can include multiple antennae and a corresponding switch, where an antenna is substantially the same as an antenna 175 described above, and the optional switch is substantially the same as the optional switch 145 described above. In such a case, the electrical device 102-1 can have one antenna 175 with no switch 145 or multiple antennae 175 with a corresponding switch 145. Alternatively, the communication device 190 of the object 160 can include a single antenna.

The user 150, the network manager 180, and/or any other applicable electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to the user 150, the controller 104 of another electrical device 102-N, and the network manager 180. The user 150 and the network manager 180 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, and the network manager 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment). For example, if the electrical device 102-1 is located in an explosive environment, the housing 103 can be explosion-proof. According to applicable industry standards, an explosion-proof enclosure is an enclosure that is configured to contain an explosion that originates inside, or can propagate through, the enclosure.

The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the power supply 140, the one or more antenna 175, the optional switch 145, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with the user 150, the network manager 180, and one or more of the objects 160, and any other applicable electrical devices 102-N within the system 100. In one or more example embodiments, the storage repository 130 stores one or more protocols 132, algorithms 133, and object data 134. The protocols 132 can be any procedures (e.g., a series of method steps) and/or other similar operational procedures that the control engine 106 of the controller 104 follows based on certain conditions at a point in time.

The protocols 132 can also include any of a number of communication protocols that are used to send and/or receive data between the controller 104 and the user 150, the network manager 180, any other applicable electrical devices 102-N, and one or more of the objects 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

The algorithms 133 can be any procedures (e.g., a series of method steps), formulas, logic steps, mathematical models, forecasts, simulations, and/or other similar operational procedures that the control engine 106 of the controller 104 follows based on certain conditions at a point in time. An example of one or more algorithms 133 is calculating, using signal strengths, the distance of an object 160 to one or more electrical devices 102 and using these calculations to determine the location of the object 160 in a volume of space 199. Another example of one or more algorithms 133 is to track movement of an object 160 in the volume of space 199.

Object data 134 can be any data associated with each object 160 that is communicably coupled to the controller 104. Such data can include, but is not limited to, a manufacturer of the object 160, a model number of the object 160, communication capability of an object 160, last known location of the object 160, and age of the object 160. The storage repository 130 can also include other types of data, including but not limited to user preferences, threshold values, and three-dimensional locations of the electrical devices 102 in the volume of space 199.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, algorithms 133, and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, any other applicable electrical devices 102-N, and the objects 160 in the system 100. More specifically, the control engine 106 sends information to and/or receives information from the storage repository 130 in order to communicate with the user 150, the network manager 180, any other applicable electrical devices 102-N, and the objects 160. As discussed below, the storage repository 130 can also be operatively connected to the communication module 108 in certain example embodiments.

In certain example embodiments, the control engine 106 of the controller 104 controls the operation of one or more other components (e.g., the communication module 108, the timer 110, the transceiver 124) of the controller 104. For example, the control engine 106 can put the communication module 108 in "sleep" mode when there are no communications between the controller 104 and another component (e.g., an object 160, the user 150) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to receive, using one or more of the antennae 175, RF signals 195 from one or more objects 160 in the system 100. This example provides another instance where the control engine 106 can conserve power used by the controller 104 and other components (e.g., the objects 160) of the system 100.

The control engine 106 can determine when to receive one or more RF signals 195 in an attempt to locate an object 160. To conserve energy, the control engine 106 does not constantly receive RF signals 195, but rather only does so at discrete times. The control engine 106 can be active to receive a RF signal 195 based on one or more of a number of factors, including but not limited to passage of time, the occurrence of an event, instructions from a user 150, and a command received from the network manager 180. Alternatively, the control engine 106 can be on at all times.

The control engine 106 of the controller 104 can determine the strength of each RF signal 195 received from an object 160. The control engine 106 of the controller 104 can also determine the relative strength of one RF signal 195 relative to another RF signal 195. The control engine 106 of the controller 104 can also determine the location of an object 160 in the volume of space 199 based on the relative strengths of the RF signals 195. In some cases, each electrical device 102 can have some form of a controller 104. The control engine 106 of one controller 104 of the electrical device 102-1 can coordinate with the controllers 104 of one or more of the other electrical devices 102-N. The control engine 106 can operate one or more optional switches 145 to accomplish its function.

In some cases, the control engine 106 of the electrical device 102-1 can locate the object 160 based on one or more RF signals 195 sent by (e.g., originated from) the object 160 in response to one or more RF signals 195 broadcast by the electrical device 102-1. To accomplish this, the control engine 106 obtains an RF signal 195 (e.g., directly from the antennae 175) broadcast by the object 160 and/or reflected from the object 160. The control engine 106 can also use one or more protocols 132 and/or algorithms 133 to determine the multi-dimensional location of the object 160 based on the RF signals 195.

For example, the protocols 132 and/or algorithms 133 used by the control engine 106 can require the control engine 106 to determine the strength of each RF signal 195 received from an object 160. The protocols 132 and/or algorithms 133 are used by the control engine 106 to dictate when and how the control engine 106 operates the optional switch 145. The protocols 132 and/or algorithms 133 can also be used by the control engine 106 to determine the relative strength of one RF signal 195 relative to another RF signal 195. The protocols and/or algorithms 133 can also be used by the control engine 106 to determine the location of an object 160 in the volume of space 199 based on the relative strengths of the RF signals 195.

In addition to locating an object 160, the control engine 106 of the controller 104 can track, according to example embodiments, the movement of the object 160 over time in the volume of space 199. In addition, or in the alternative, the control engine 106 of the controller 104 can detect, according to example embodiments, when the object 160 is moving or has moved from a previously-known location in the volume of space 199.

The control engine 106 can provide control, communication, RF signals 195, and/or other signals to the user 150, the network manager 180, the other electrical devices 102-N, and one or more of the objects 160. Similarly, the control engine 106 can receive control, communication, RF signals 195, and/or other signals from the user 150, the network manager 180, the other electrical devices 102-N, and one or more of the objects 160. The control engine 106 can communicate with each object 160 automatically (for example, based on one or more algorithms 133 stored in the storage repository 130) and/or based on control, communication, and/or other similar signals received from another device (e.g., the network manager 180) using the RF signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and the user 150, the network manager 180, any other applicable electrical devices 102-N, and the objects 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I²C), and a pulse width modulator (PWM).

Using example embodiments, while at least a portion (e.g., the control engine 106, the timer 110) of the controller 104 is always on, the remainder of the controller 104 and the objects 160 can be in sleep mode when they are not being used. In addition, the controller 104 can control certain aspects (e.g., sending RF signals 195 to and receiving RF signals 195 from an object 160, operating an optional switch 145) of one or more other applicable electrical devices in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and the user 150, the network manager 180, and any other applicable electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) the user 150, the network manager 180, any other applicable electrical devices 102-N, and/or one or more of the objects 160. In some cases, the communication module 108 accesses the object data 134 to determine which communication protocol is within the capability of the object 160 for a RF signal 195 sent by the control engine 106. In addition, the communication module 108 can interpret the communication protocol of a communication (e.g., a RF signal 195) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure multiple times simultaneously. The timer 110 can track time periods based on an instruction received from the control engine 106, based on an instruction received from the user 150, based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power supply 140 of the electrical device 102-1. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102-1 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by the user 150, and the network manager 180, and/or any other applicable electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals, including RF signals 195. In this way, the transceiver 124 can include a transmitter and/or a receiver. Specifically, the transceiver 124 can be used to transfer data between the controller 104 and the user 150, the network manager 180, any other applicable electrical devices 102-N, and/or the objects 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, any other applicable electrical devices 102-N, and/or the objects 160.

When the transceiver 124 uses wireless technology, any type of wireless technology can be used by the transceiver 124 in sending and receiving signals. Such wireless technology can include, but is not limited to, Wi-Fi, visible light communication, cellular networking, Bluetooth, and BLE. The transceiver 124 can use one or more of any number of suitable communication protocols (e.g., ISA100, HART) when sending and/or receiving signals, including RF signals 195. Such communication protocols can be stored in the protocols 132 of the storage repository 130. Further, any transceiver information for the user 150, the network manager 180, any other applicable electrical devices 102-N, and/or the objects 160 can be part of the object data 134 (or similar areas) of the storage repository 130.

Optionally, in one or more example embodiments, the security module 128 secures interactions between the controller 104, the user 150, the network manager 180, any other applicable electrical devices 102-N, and/or the objects 160. More specifically, the security module 128 authenticates communication from software based on security keys verifying the identity of the source of the communication. For example, user software may be associated with a security key enabling the software of the user 150 to interact with the controller 104 of the electrical device 102-N. Further, the security module 128 can restrict receipt of information, requests for information, and/or access to information in some example embodiments.

As mentioned above, aside from the controller 104 and its components, the electrical device 102-1 can include a power supply 140, one or more antennae 175, an optional switch 145, and one or more electrical device components 142. The electrical device components 142 of the electrical device 102-1 are devices and/or components typically found in the electrical device 102-1 to allow the electrical device 102-1 to operate. An electrical device component 142 can be electrical, electronic, mechanical, or any combination thereof. The electrical device 102-1 can have one or more of any number and/or type of electrical device components 142. For example, if the electrical device 102-1 is a light fixture, then examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 provides power to the controller 104 and/or one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate, based on power that it receives, power of a type (e.g., alternating current, direct current) and level (e.g., 12V, 24V, 120V) that can be used by the recipients (e.g., the electrical device components 142, the controller 106) of such power. In addition, or in the alternative, the power supply 140 can receive power from a source external to the electrical device 102-1-1. In addition, or in the alternative, the power supply 140 can be a source of power in itself. For example, the power supply 140 can be a battery, a localized photovoltaic power system, or some other source of independent power.

As discussed above, the electrical device 102-1 includes one or more antennae 175. An antenna 175 is an electrical device that converts electrical power to RF signals 195 (for transmitting) and RF signals 195 to electrical power (for receiving). In transmission, a radio transmitter (e.g., transceiver 124) supplies, through the optional switch 145, an electric current oscillating at radio frequency (i.e. a high frequency alternating current (AC)) to the terminals of the antenna 175, and the antenna radiates the energy from the current as RF signals 195. In reception, an antenna 175 intercepts some of the power of RF signals 195 in order to produce a tiny voltage at its terminals, that is applied through the switch 145 to a receiver (e.g., transceiver 124) to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse RF signal 195 (often an electromagnetic field wave). Conversely, during reception, the oscillating electric and magnetic fields of an incoming RF signal 195 create oscillating currents in the antenna 175.

In certain example embodiments, an antenna 175 can be disposed at, within, or on any portion of the electrical device 102-1. For example, an antenna 175 can be disposed on the housing 103 of the electrical device 102-1 and extend away from the electrical device 102-1. As another example, an antenna 175 can be insert molded into a lens of the electrical device 102-1. As another example, an antenna 175 can be two-shot injection molded into the housing 103 of the electrical device 102-1. As yet another example, an antenna 175 can be adhesive mounted onto the housing 103 of the electrical device 102-1. As still another example, an antenna 175 can be pad printed onto a circuit board within the cavity 101 formed by the housing 103 of the electrical device 102-1. As yet another example, an antenna 175 can be a chip ceramic antenna that is surface mounted. As still another example, an antenna 175 can be a wire antenna.

An antenna 175 can be electrically coupled to the optional switch 145, which in turn is electrically coupled to the transceiver 124. Without the switch 145, an antenna 175 is directly electrically coupled to the transceiver 124. The optional switch 145 can be a single switch device or a number of switch devices arranged in series and/or in parallel with each other. The switch 145 determines which antenna 175 (in the case of multiple antennae 175) or when the lone antenna 175 is coupled to the transceiver 124 at any particular point in time.

A switch 145 can have one or more contacts, where each contact has an open state and a closed state (position). In the open state, a contact of the switch 145 creates an open circuit, which prevents the transceiver 124 from delivering a RF signal 195 to or receiving a RF signal 195 from the antenna 175 electrically coupled to that contact of the switch 145. In the closed state, a contact of the switch 145 creates a closed circuit, which allows the transceiver 124 to deliver a RF signal 195 to or receive a RF signal 195 from the antenna 175 electrically coupled to that contact of the switch 145. In certain example embodiments, the position of each contact of the optional switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
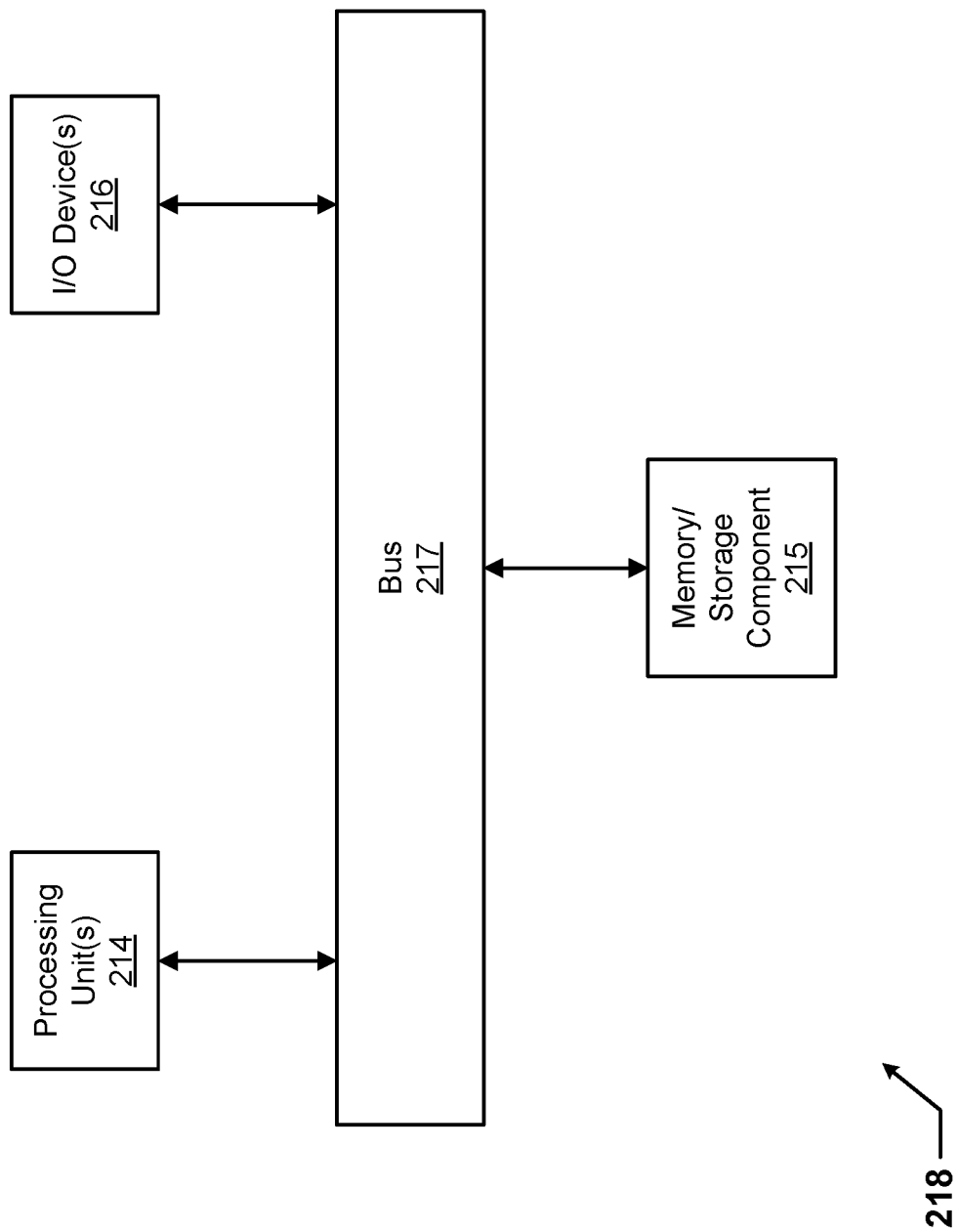
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, the controller 104 of FIG. 1, including its various components (e.g., control engine 106, hardware processor 120, memory 122, storage repository 130) can be considered, in whole or in part, a computing device 218. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
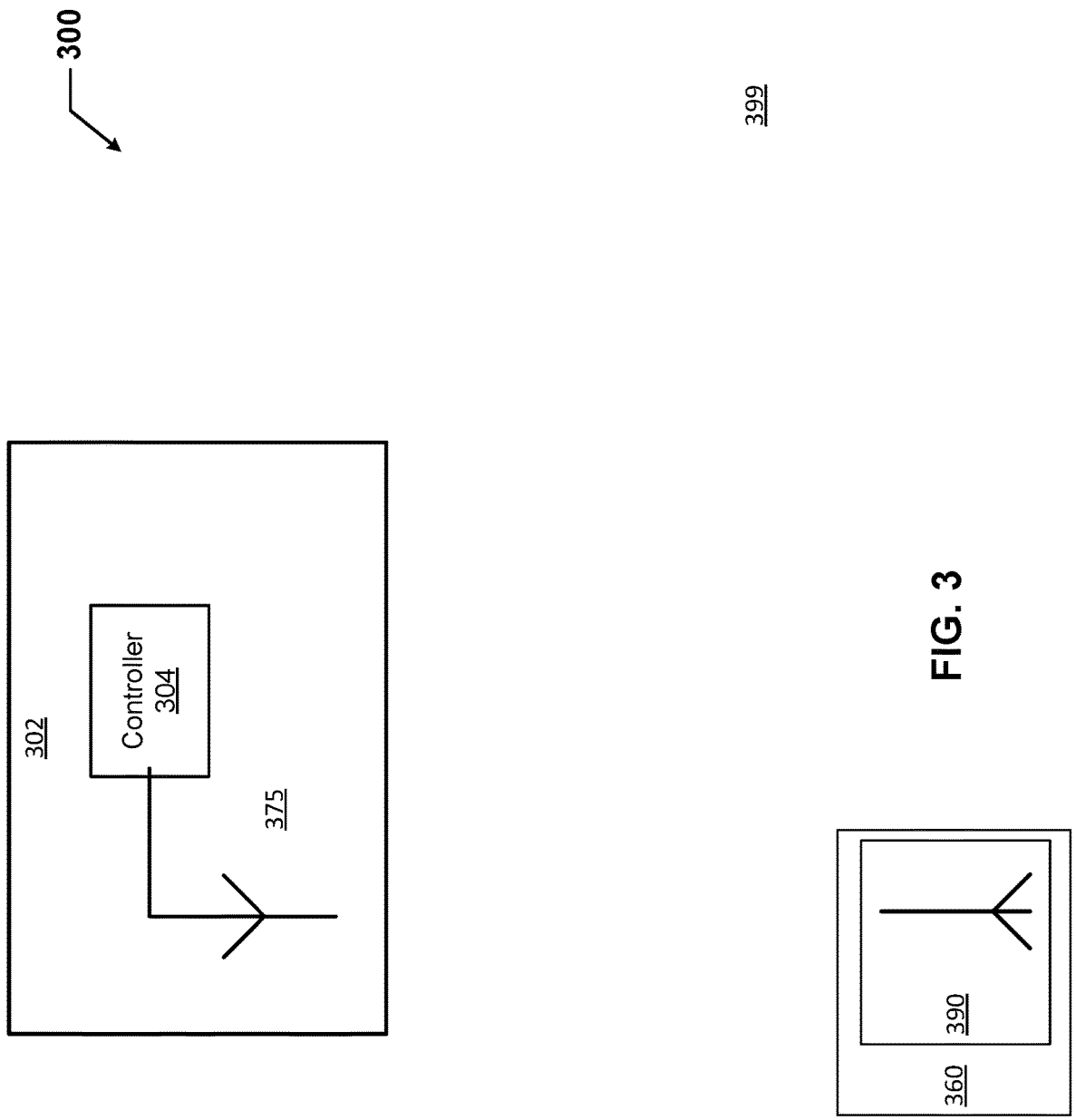
FIG. 3 shows a system in which an object is located in a volume of space in accordance with certain example embodiments.

FIG. 3 shows a system 300 that use a light fixture 302 (a type of electrical device) to locate an object 360 in a volume of space 399. Referring to FIGS. 1 through 3, the light fixture 302 includes an antenna 375. As discussed above, the volume of space 399 can be of any size and/or in any location. For example, the volume of space 399 can be a room in an office building.

As shown in FIG. 3, the antenna 375 of the light fixture 302 can be located in the volume of space 399. Alternatively, the antenna 375 can be located on another device (e.g., another light fixture). In any case, it is possible that the antenna 375 can be located outside the volume of space 399, as long as the RF signals (e.g., RF signals 195) sent by the communication device 390 of the object 360 are received by the antenna 375 of the light fixture 302.

The light fixture 302 can also include, as part of the controller 304 of FIG. 3, a control engine (e.g., control engine 106) for automatically operating a transceiver (e.g., transceiver 124) for sending and/or receiving RF signals. Further, the object 360 of FIG. 3 includes a communication device 390, which can be substantially the same as the communication device 190 discussed above with respect to FIG. 1. For example, as shown in FIG. 3, the communication device 390 of FIG. 3 can include an antenna. In some cases, the communication device 390 can also include a controller, which can perform at least some of the capabilities of the controller 104 described above.

Figure 4:
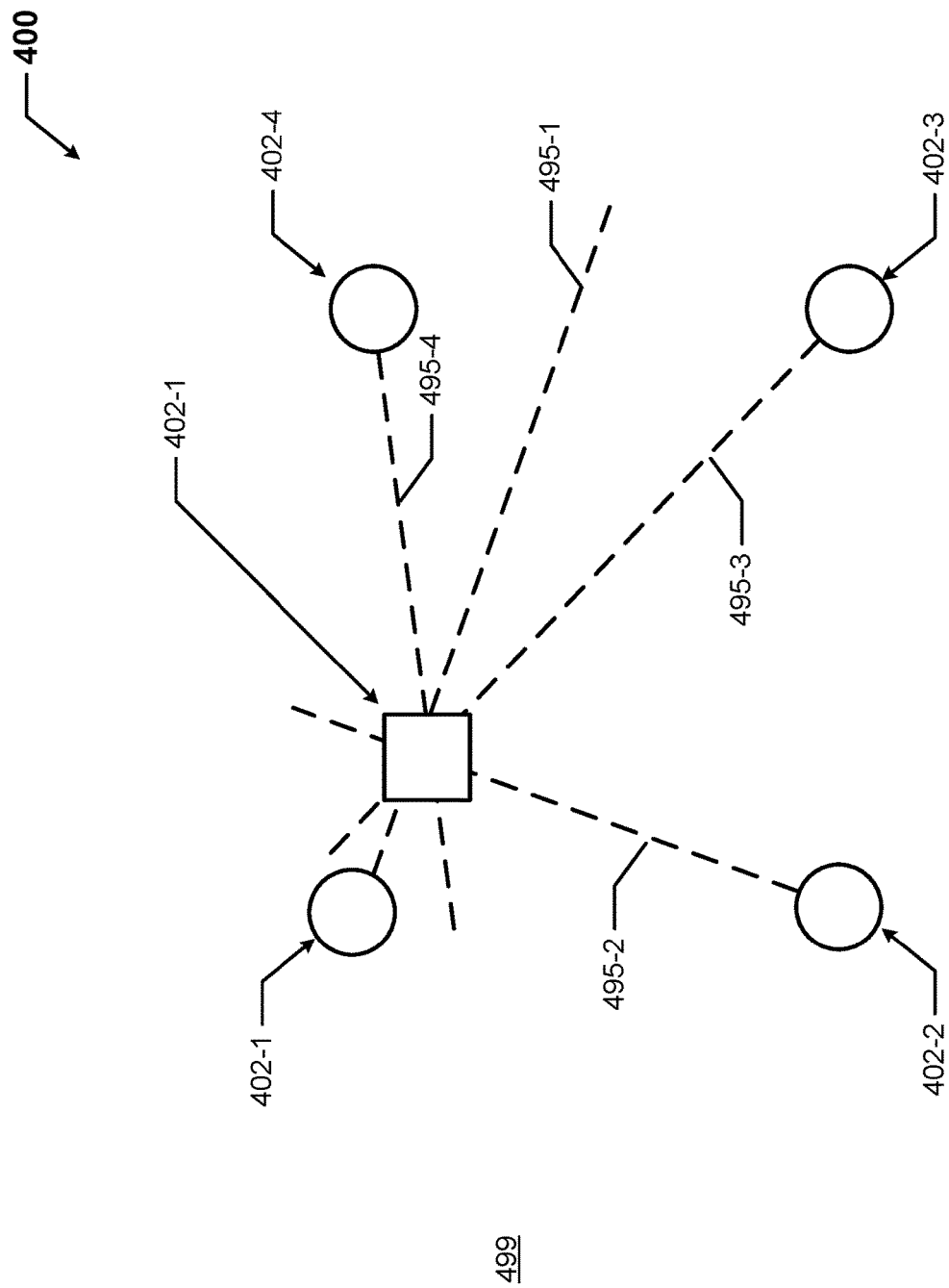
FIG. 4 shows a system of multiple light fixtures used to locate an object in the current art.

FIG. 4 shows a top view of a system 400 of multiple light fixtures 402 (a types of electrical devices) used to locate an object in the current art. Referring to FIGS. 1 through 4, the system 400 includes four light fixtures 402 (light fixture 402-1, light fixture 402-2, light fixture 402-3, and light fixture 402-4) and an object 460 located in a volume of space 499. To locate the object 460 in the volume of space 499, each light fixture 402 receives (and in some cases transmits) one or more RF signals 495. Specifically, light fixture 402-1 receives RF signal 495-1 and determines the amplitude (and also in some cases the angle) at which the RF signal 495-1 arrives. Light fixture 402-2 receives RF signal 495-2 and determines the amplitude of (and also in some cases the angle at which) the RF signal 495-2 arrives. Light fixture 402-3 receives RF signal 495-3 and determines the amplitude of (and also in some cases the angle at which) the RF signal 495-3 arrives. Light fixture 402-4 receives RF signal 495-4 and determines the amplitude of (and also in some cases the angle at which) the RF signal 495-4 arrives. In addition, all four of the light fixtures 402 have a default broadcast range that overlap with each other, which is why the RF signal 495 for each light fixture 402 reaches the object 460 in the volume of space.

In order to evaluate the precise location of the object 460 in the volume of space 499, a controller (e.g., controller 104) of one of the light fixtures 402 or some other controller (e.g., network manager 180) in the system 400 collects all of the data from all of the light fixtures 402 and processes the data using one or more algorithms (e.g., algorithms 133) and/or protocols (e.g., protocols 132). This evaluation is often performed on a continuous basis. In any case, the process in the current art to locate the object 460 is very processor and data intensive, which leads to high costs, increased energy consumption, and resource consuming.

Figure 5:
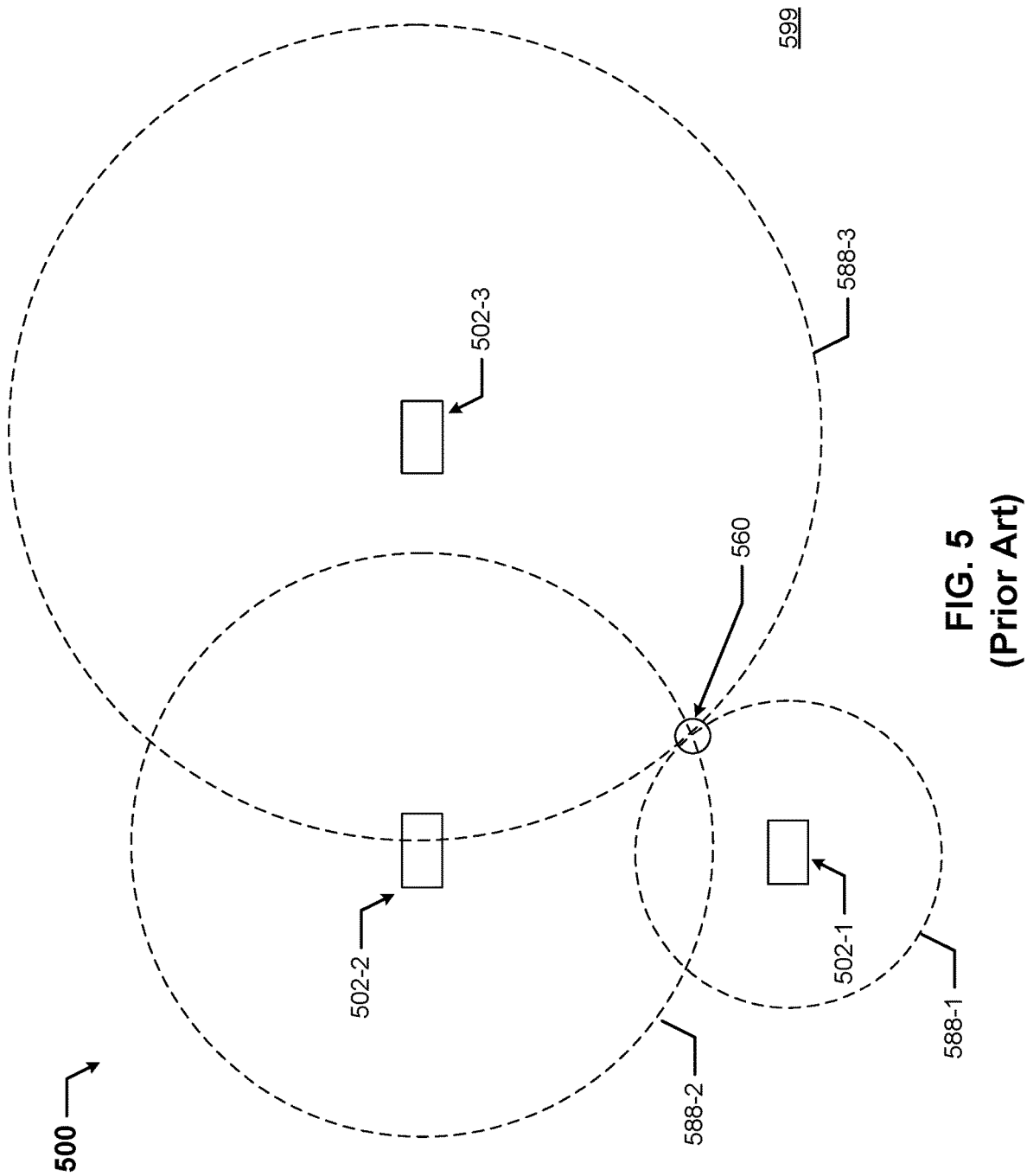
FIGS. 5 and 6 show another system of multiple light fixtures used to locate an object in the current art.
Figure 6:
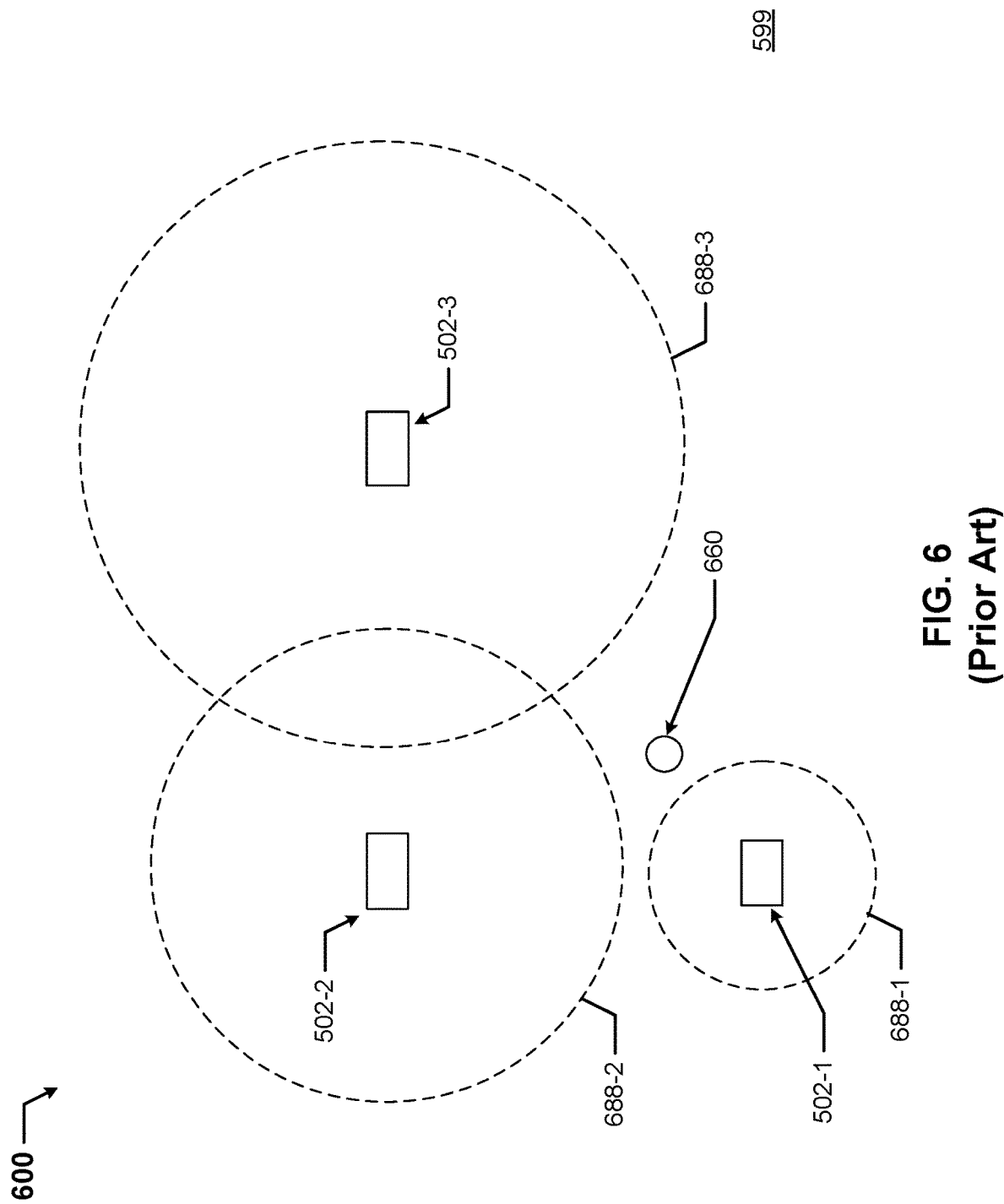

FIGS. 5 and 6 show another system of multiple light fixtures (types of electrical devices) used to locate an object in the current art. Specifically, FIG. 5 shows a top view of a system 500 under theoretically ideal conditions. FIG. 6 shows a top view of the system 600 (arranged identically to the system 500 of FIG. 5) under real-life conditions. Referring to FIGS. 1 through 6, the system 500 of FIG. 5 includes three light fixtures 502 (light fixture 502-1, light fixture 502-2, and light fixture 502-3) and an object 560 disposed in a volume of space 599.

In this case, the light fixtures 502 are designed to locate the object 560 using received signal strength indication (RSSI). Trilateration methods using RSSI can depend on approximating physical proximity to the object 560 using, for example, a free space path loss formula. A RF signal falls off with the square of distance, so distance can be calculated based on a known quantity of a number of factors, including but not limited to transmit power, transmit antenna gain, receiver antenna gain, received RF signal power, and frequency of the propagating wave. If the object 560 uses BLE technology to broadcast RF signals, the BLE beacon payload contains transmit power information, and received power is measured at the received side of the link, so subtracting the received power from the known transmitted power of a RF signal, in theory, provides the attenuation of the signal over the air, or the free space path loss.

If antenna gains are assumed, then the flight distance of the RF signal can be calculated. In this case, under the theoretical case of FIG. 5, the location of the object 560 in the object of space 599 is correctly identified, using trilateration and/or triangulation, based on light fixture 502-1 using RSSI to determine that the object 560 is distance 588-1 from light fixture 502-1, based on light fixture 502-2 using RSSI to determine that the object 560 is distance 588-2 from light fixture 502-2, and based on light fixture 502-3 using RSSI to determine that the object 560 is distance 588-3 from light fixture 502-3. In other words, if three or more distances 588 are estimated, then trilateration methods can be used to determine an approximate location of the object 560 by determining where the calculated radii intersect.

A major problem with the theoretical case of FIG. 5 is that reality, as shown by the system 600 of FIG. 6, produces vastly different result. The system 600 of FIG. 6 includes the light fixtures 502 (light fixture 502-1, light fixture 502-2, and light fixture 502-3) and the object 560 of FIG. 5, and these components of the system 600 of FIG. 6 are located the same as they are in the system 500 of FIG. 5 in the volume of space 599. In reality, different from the theoretical construct of FIG. 5, there is much potential for error in calculating an absolute distance 688. Using RSSI in reality, as shown in FIG. 6, the antenna gains are estimated because the orientation of the transmitter (in this case, the object 560) and the receivers (in this case, the light fixtures 502) are unknown. This introduces a significant amount of error that is dependent on one or more of a number of factors, such as the orientation of the asset tag.

As a result, light fixture 502-1 uses RSSI to determine that the object 560 is distance 688-1 from light fixture 502-1, light fixture 502-2 uses RSSI to determine that the object 560 is distance 688-2 from light fixture 502-2, and light fixture 502-3 uses RSSI to determine that the object 560 is distance 688-3 from light fixture 502-3. As a result, trilateration and/or triangulation fails to locate the object 560 in the volume of space 599. Improvements in the form of scaling one or more factors (e.g., the radii) in RSSI techniques are used in example embodiments, as explained below.

Figure 7:
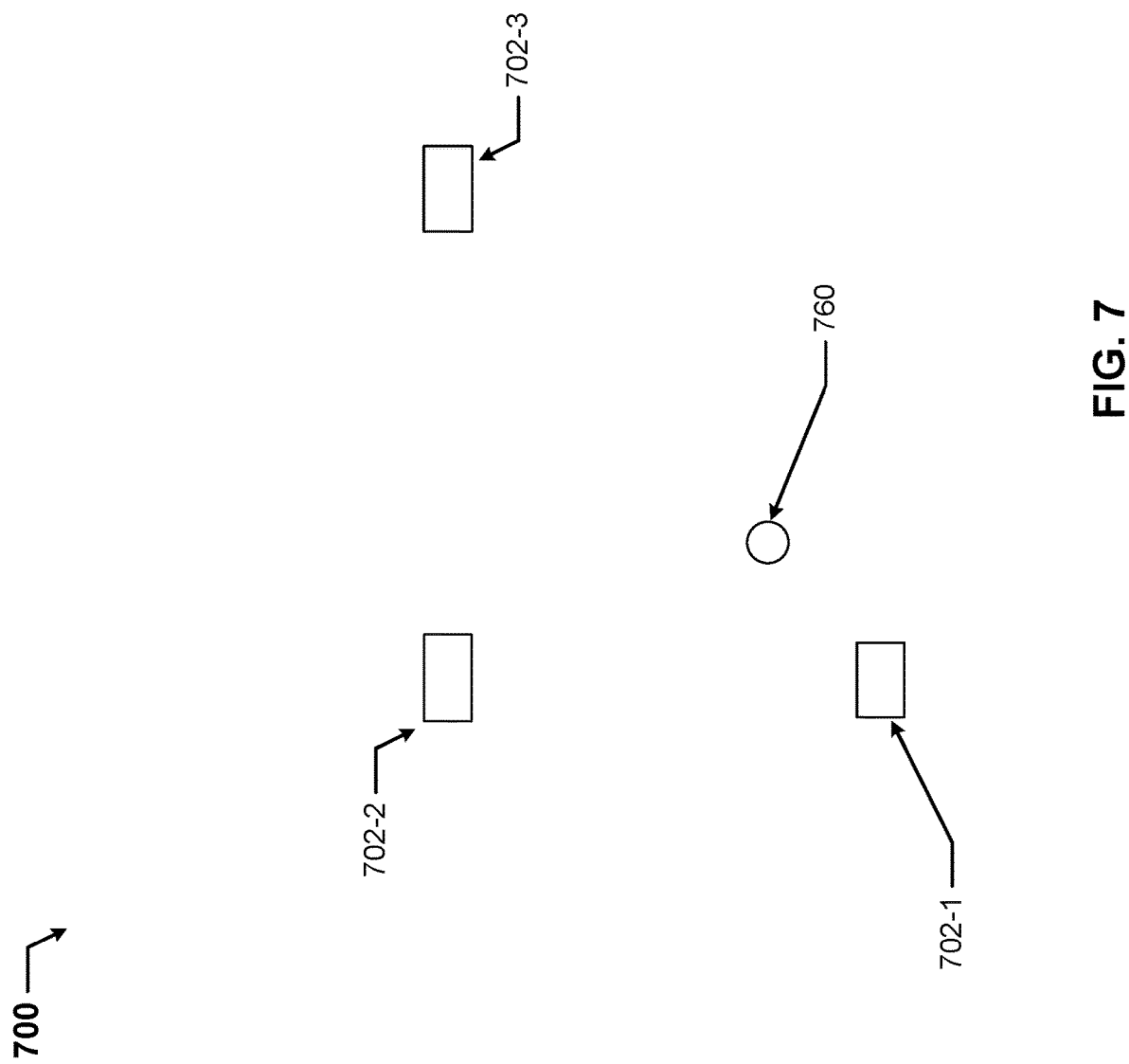
FIG. 7 shows a system for locating an object with multiple light fixtures in accordance with certain example embodiments.

FIG. 7 shows a top view of a system 700 for locating an object 760 with multiple light fixtures 702 (types of electrical devices) in accordance with certain example embodiments. Referring to FIGS. 1 through 7, the system 700 includes light fixture 702-1, light fixture 702-2, light fixture 702-3, and object 760 located in the volume of space 799 and positioned with respect to each other identically to what is shown with the system 500 of FIG. 5 and the system 600 of FIG. 6.

The example relative scaling method described herein alleviates at least some of the errors inherent to absolute distance calculations by not relying only on relative RSSI measurements. Instead of calculating a distance to each BLE node (light fixture 702), the RSSI levels at each light fixture 702 are compared to each other to create a relative relationship at each BLE node (each light fixture 702). When the light fixtures 702 are all in the same plane (e.g., mounted on a planar ceiling), the fluctuations in electric field due to tag orientation (e.g., part of the communication device 190) of the object 760 will be relatively consistent across the different BLE nodes (light fixtures 702). For example, if a tag of the object 760 is rotated so that an antenna null is broadside to the ceiling defining part of the volume of space 799, the signal level at any given BLE node (light fixture 702) will drop significantly, causing distance calculation error, as shown in FIG. 6 above. However, for BLE nodes (light fixtures 702) located relatively close to the tag of the object 760, the drop (decrease) in signal level will be somewhat uniform.

For example, by choosing the RF signal with the highest RSSI, a proximity detection can be performed by a controller (e.g., controller 104, network manager 180), and then weighted scaling can be performed by the controller on the other RF signals based on the relative signal strengths at the various nodes (light fixtures 702). When the location of each light fixture 702 (including, for example, a BLE receiver) is known (for example, through the commissioning process), the relative distance between adjacent light fixtures 702 is also known or can be calculated.

As a specific example, a controller can choose the highest RSSI from light fixture 702-1, light fixture 702-2, or light fixture 702-3. In this example, light fixture 702-1 is selected because it receives the highest RSSI due to its relatively close proximity to the object 760. The controller of light fixture 702-1 (or another controller in the system 700) then scales the planar (e.g., X-Y) location of the object 760 by the difference in RSSI from the adjacent light fixtures (e.g., light fixture 702-2, light fixture 702-3) in the plane.

For instance, if the strength (RSSI) of the RF signal received by light fixture 702-2 (using, for example, BLE) from the object 760 is 2 dB less than the strength (RSSI) of the RF signal received by light fixture 702-1 from the object 760, the controller can scale the location of the object 760 in the Y-axis by a factor of $10^{(2/20)}=1.26$ from the midpoint between light fixture 702-1 and light fixture 702-2, resulting in a location of the object 760 between light fixture 702-1 and light fixture 702-2, but closer to light fixture 702-1. The process can be repeated along the X-axis (or in some other direction along the plane formed by the light fixtures 702).

Figure 8:
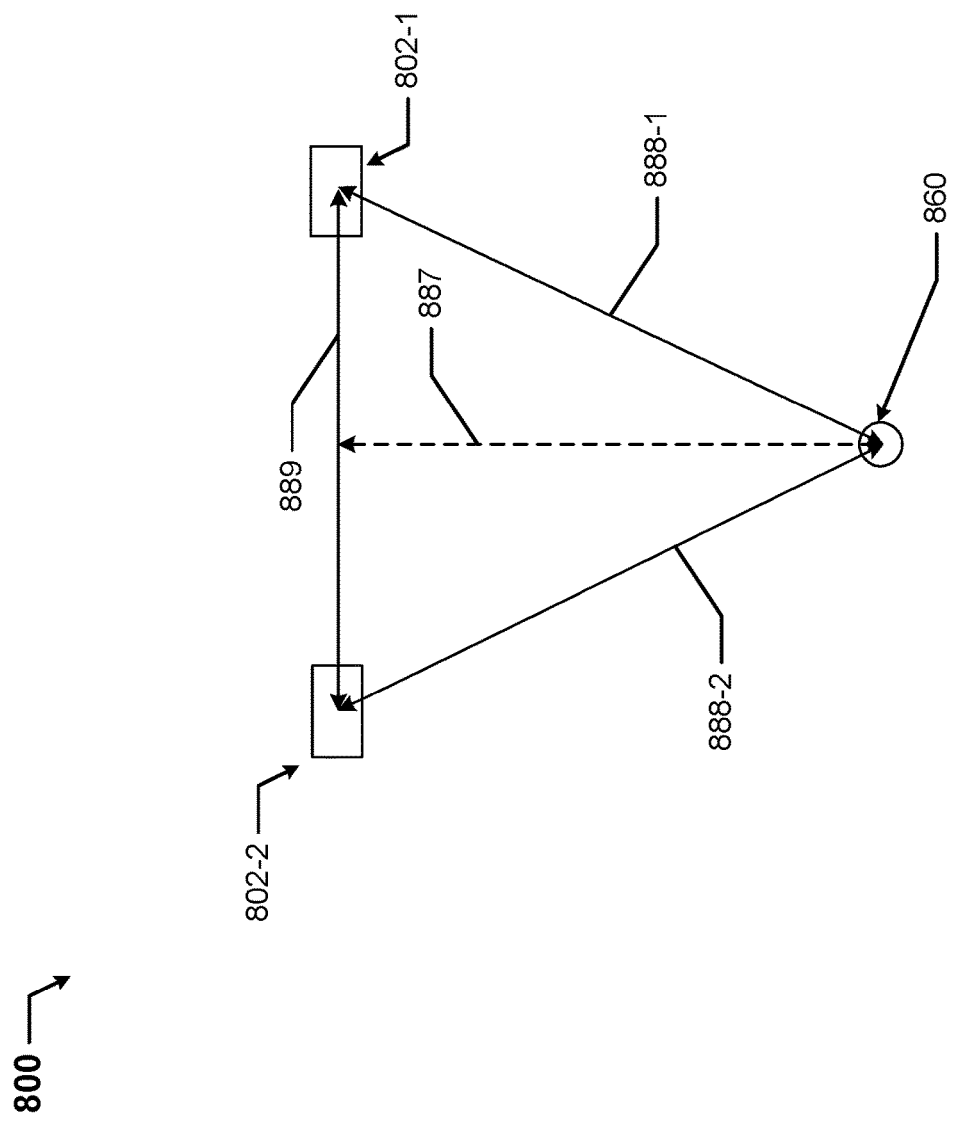
Figure 9:
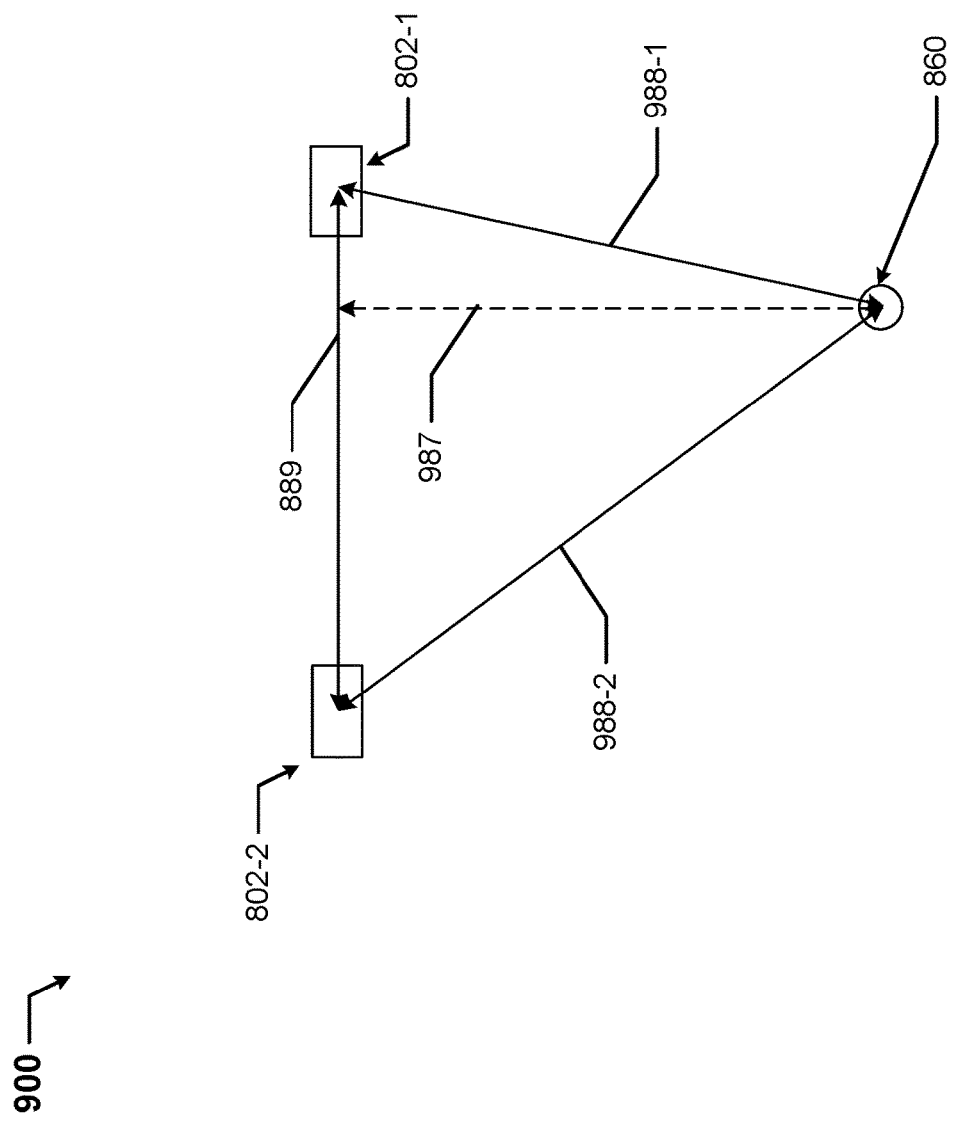

FIGS. 8 through 10 show various examples of locating an object with multiple light fixtures 802 (types of electrical devices) in accordance with certain example embodiments. Specifically, FIG. 8 shows a side view of a system 800 used to locate an object 860 at a first location in accordance with certain example embodiments. FIG. 9 shows a side view of a system 900 with the object 860 at a second location. FIG. 10 shows a side view of a system 1000 used to locate the object 860 at the second location in accordance with certain example embodiments. Referring to FIGS. 1 through 10, in certain example embodiments, the scaling performed by the controller (e.g., controller 104) can be conservative because the scaling is done in the x-y plane (the horizontal plane with respect to FIGS. 8 through 10) to account for differences in the z direction (from bottom to top of FIGS. 8 through 10). This is important because the height (e.g., height 887) of the plane that includes the light fixtures 802 relative to the object 860 in the Z-direction is not known.

In the example shown in FIG. 8, the object 860 is located equidistant from light fixture 802-1 and light fixture 802-2. In other words, a Z-axis (which includes height 887) running through the object 860 evenly divides the distance 889 between light fixture 802-1 and light fixture 802-2. In addition, the strength of the RF signals transmitted (broadcast) by the object 860 to the light fixture 802-1 and to the light fixture 802-2 is substantially the same as each other.

In this way, the controller (e.g., a controller of light fixture 802-1, a controller of light fixture 802-2, the network manager 180, some other controller in the system 800) can determine that the strength of both RF signals is substantially the same, and based on the distance 889 between light fixture 802-1 and light fixture 802-2, determine the height 887 of the plane (in this case, an X-Y plane) that includes light fixture 802-1 and light fixture 802-2 from the object 860, determine that the object 860 is distance 888-1 from light fixture 802-1, and determine that the object 860 is distance 888-2 from light fixture 802-2. This determination of distance 888-1 and distance 888-2 may or may not involve scaling by the controller in this case since the object 860 is located substantially equidistantly from light fixture 802-1 and light fixture 802-2.

So, as a very specific example, if the distance 889 between light fixture 802-1 and light fixture 802-2 is known to be 6 feet, if the strength of the signal received by light fixture 802-1 from the object 860 is −45 dBm, and if the strength of the signal received by light fixture 802-2 from the object 860 is −45 dBm, the controller can calculate that the distance 888-1 between the object 860 and light fixture 802-1 is approximately 5 feet, and that the distance 888-2 between the object 860 and light fixture 802-2 is also approximately 5 feet. In this way, the controller can also determine that the height 887 between the object 860 and the X-Y plane that includes light fixture 802-1 and light fixture 802-2 is approximately 4 feet.

The system 900 of FIG. 9 includes the object 860, light fixture 802-1, and light fixture 802-2 in the volume of space 899, but here the object 860 has moved relative to its position in FIG. 8. As an example, the RF signal received by light source 802-1 from the object 860 can be 6 dB higher than the RF signal received by light source 802-2. In such a case, the actual difference in flight paths (distance 988-2 between the object 860 and light source 802-2, and distance 988-1 between the object 860 and light source 802-1) of the signal is 5.7/4.5=1.2. Note than in the X-Y plane (the plane that includes light sources 802-1 and 802-2), the object 860 is actually twice as far from light source 802-2 than light source 802-1.

The system 1000 of FIG. 10 is identical to the system 900 of FIG. 9, except that example embodiments are used to estimate the location of the object 860. In this case, the controller scales the RF signals based on the real flight path difference (the hypotenuses, or the distance 988-1 and distance 988-2 in FIG. 9), the scaling factor arrived at by the controller can be lower than reality. The scaling factor established by the controller in this example determines that the object 860 is 1.2 times closer to light source 802-1 compared to light source 802-2, rather than 2 times closer. These conservative scaling methods used in example embodiments can be preferred, as RSSI measurements are prone to error. Example embodiments increase accuracy relative to the current RSSI methods, and also can require less processing capacity.

So, as a very specific example, since the distance 889 between light fixture 802-1 and light fixture 802-2 is still known to be 6 feet, if the strength of the signal received by light fixture 802-1 from the object 860 is −42 dBm, and if the strength of the signal received by light fixture 802-2 from the object 860 is −48 dBm, the controller can calculate that the distance 1088-1 between the object 860 and light fixture 802-1 is approximately 4.8 feet, and that the distance 1088-2 between the object 860 and light fixture 802-2 is also approximately 5.2 feet. In this way, the controller can also determine that the height 1087 between the object 860 and the X-Y plane that includes light fixture 802-1 and light fixture 802-2 remains at approximately 4 feet.

While in this series of examples, as shown in FIGS. 8 through 10, the object 860 moves along an X-Y plane that is in parallel to the plane that includes light fixture 802-1 and light fixture 802-2, example embodiments can be used to locate the object 860 when the object 860 additionally or alternatively moves in the Z-direction (perpendicular to the X-Y plane).

Figure 11A:
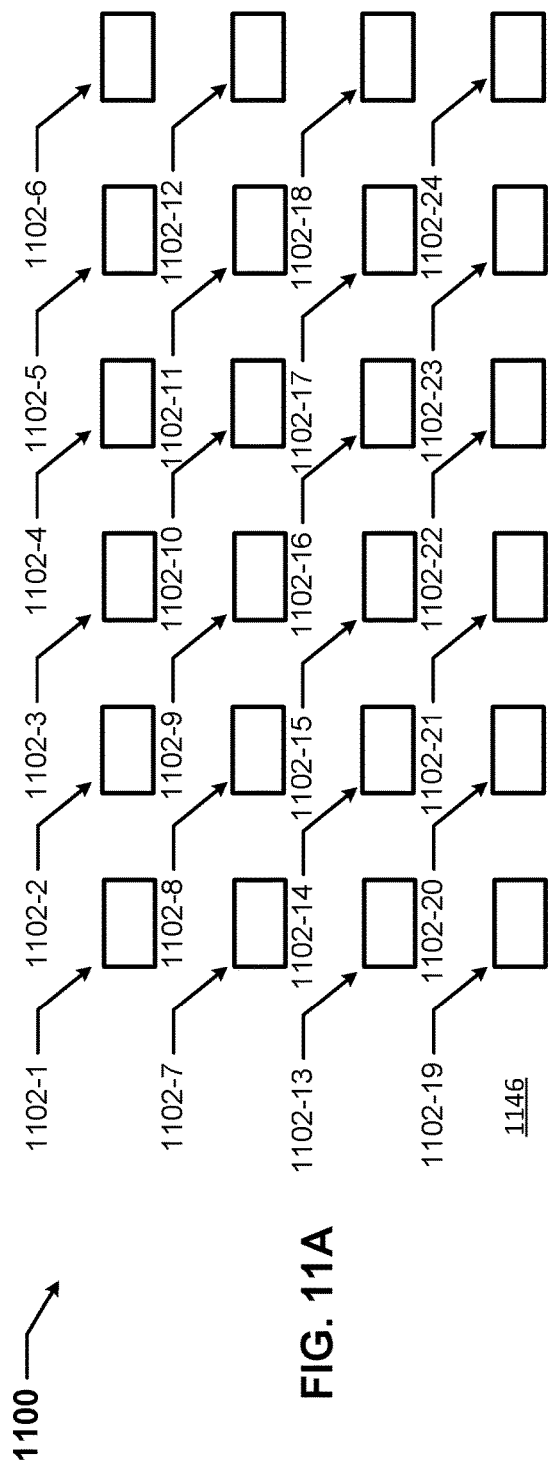
FIGS. 11A and 11B show an example lighting system in accordance with certain example embodiments.
Figure 11B:
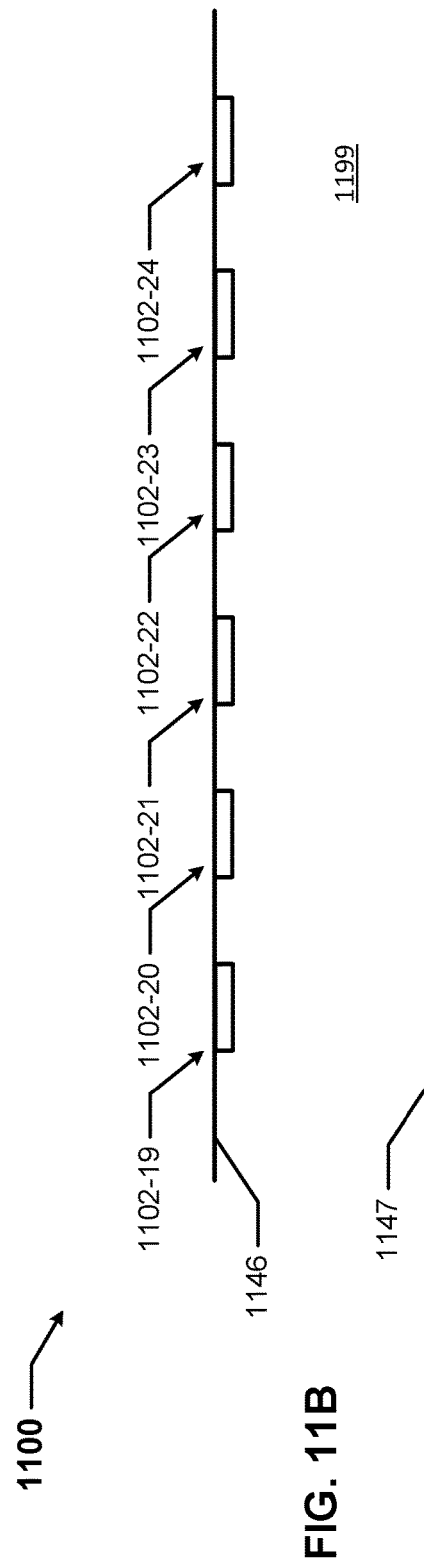

FIGS. 11A and 11B show an example lighting system 1100 in accordance with certain example embodiments. Specifically, FIG. 11A shows a bottom view of the lighting system 1100, and FIG. 11B shows a side view of the lighting system 1100. Referring to FIGS. 1 through 11B, the lighting system 1100 of FIGS. 11A and 11B show how all of the light fixtures 1102 (types of electrical devices) can be arranged in a grid pattern in the same plane. In this case, all of the light fixtures 1102 are disposed on a ceiling 1146, which along with a floor 1147, help define a volume of space 1199.

The grid pattern formed by the light fixtures 1102 is 4 rows by 6 columns. One row includes light fixture 1102-1, light fixture 1102-2, light fixture 1102-3, light fixture 1102-4, light fixture 1102-5, and light fixture 1102-6. The next row includes light fixture 1102-7, light fixture 1102-8, light fixture 1102-9, light fixture 1102-10, light fixture 1102-11, and light fixture 1102-12. The next row includes light fixture 1102-13, light fixture 1102-14, light fixture 1102-15, light fixture 1102-16, light fixture 1102-17, and light fixture 1102-18. The final row includes light fixture 1102-19, light fixture 1102-20, light fixture 1102-21, light fixture 1102-22, light fixture 1102-23, and light fixture 1102-24. Each row is equally spaced relative to each other, and each column is equally spaced relative to each other.

While example embodiments described herein are similar to the lighting system 1100 of FIGS. 11A and 11B, where all of the light fixtures are arranged in a grid pattern in the same plane (e.g., the X-Y plane), other example embodiments can be used with lighting systems that have light fixtures arranged in something other than a grid pattern and/or in more than a single plane (e.g., in multiple parallel planes, randomly in a three-dimensional space). In such a case, the controller can make the necessary adjustments for these differences, with knowledge of the actual positioning of the light fixtures in the system.

Example embodiments can utilize the density and uniformity of a system (e.g., a lighting system) that includes multiple electrical devices (e.g., light fixtures) to estimate the location of an object using simplified relative RSSI comparison methods. Example embodiments are more immune changes in the orientation of the object (or communication module thereof) because relative (rather than absolute) strengths of RF signals are analyzed. Further, a level of electric field uniformity can be expected across a defined plane in space (e.g., the plane containing the light fixtures). Example embodiments can determine the location of an object in a volume of space independent of ceiling height or other dimensions within the volume of space.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system comprising:
an object comprising a communication device, wherein the communication device of the object broadcasts a first radio frequency signal from a first location within a volume of space at a first time;
a first light fixture disposed at a first light fixture location in the volume of space and comprising at least one first light source, a first antenna, and a first receiver, wherein the first receiver, using the first antenna, receives the first radio frequency signal, wherein the at least one first light source provides a first general illumination to the volume of space, wherein the first receiver receiving the first radio frequency signal is independent of the at least one first light source providing the first general illumination to the volume of space;
a second light fixture disposed at a second light fixture location in the volume of space, wherein the second light fixture comprises at least one second light source, a second antenna, and a second receiver, wherein the second receiver, using the second antenna, receives the first radio frequency signal, wherein the at least one second light source provides a second general illumination to the volume of space, wherein the second receiver receiving the first radio frequency signal is independent of the at least one second light source providing the second general illumination to the volume of space; and
a controller communicably coupled to the first light fixture and the second light fixture, wherein the controller:
determines a first strength of the first radio frequency signal received by the first receiver;
determines a second strength of the first radio frequency signal received by the second receiver;
determines a difference between the first strength of the first radio frequency signal received by the first receiver relative to the second strength of the first radio frequency signal received by the second receiver based on a first distance between the first light fixture location of the first light fixture and the second light fixture location of the second light fixture and starting a time period;
scales a location of the object in a first plane using the difference between the first strength of the first radio frequency signal and the second strength of the first radio frequency signal;
scales a location of the object in a second plane using the difference between the first strength of the first radio frequency signal and the second strength of the first radio frequency signal; and
determines a location of the object in the volume of space based on scaling the location of the object in the first plane and scaling the location of the object in the second plane.

2. The system of claim 1, further comprising:
a network manager comprising the controller.

3. The system of claim 1, further comprising:
a third light fixture disposed at a third light fixture location in the volume of space and communicably coupled to the controller, wherein the third light fixture comprises at least one third light source, a third antenna, and a third receiver, wherein the third receiver, using the third antenna, receives the first radio frequency signal, wherein the at least one third light source provides a third general illumination to the volume of space, wherein the third receiver receiving the first radio frequency signal is independent of the at least one third light source providing the third general illumination to the volume of space,
wherein the controller determines a third strength of the first radio frequency signal from the third receiver, wherein the controller uses the third strength of the first radio frequency signal to further determine the location of the object in the volume of space at the first time.

4. The system of claim 3, further comprising:
a fourth light fixture disposed at a fourth light fixture location in the volume of space and communicably coupled to the controller, wherein the fourth light fixture comprises at least one fourth light source, a fourth antenna, and a fourth receiver, wherein the fourth receiver, using the fourth antenna, receives the first radio frequency signal, wherein the at least one fourth light source provides a fourth general illumination to the volume of space, wherein the fourth receiver receiving the first radio frequency signal is independent of the at least one fourth light source providing the fourth general illumination to the volume of space,
wherein the controller determines a fourth strength of the first radio frequency signal from the fourth receiver, wherein the controller uses the fourth strength of the first radio frequency signal to further determine the location of the object in the volume of space at the first time.

5. The system of claim 4, wherein the first light fixture, the second light fixture, the third light fixture, and the fourth light fixture are located in a common plane.

6. The system of claim 5, wherein the controller determines the location of the object using a second distance between the first light fixture location of the first light fixture and the third light fixture location of the third light fixture in the volume of space, a third distance between the second light fixture location of the second light fixture and the third light fixture location of the third light fixture in the volume of space, a fourth distance between the second light fixture location of the second light fixture and the third device location of the third light fixture in the volume of space, a fifth distance between the second light fixture location of the second light fixture and the fourth light fixture location of the fourth light fixture in the volume of space, and a sixth distance between the third light fixture location of the third light fixture and the fourth light fixture location of the fourth light fixture in the volume of space.

7. The system of claim 5, wherein the first light fixture, the second light fixture, the third light fixture, and the fourth light fixture are among a plurality of light fixtures positioned in a grid pattern within the volume of space.

8. The system of claim 6, wherein the object broadcasts a second radio frequency signal from a second location within the volume of space at a second time, wherein the controller determines a fifth strength of the second radio frequency signal received by the first receiver, wherein the controller determines a sixth strength of the second radio frequency signal received by the second receiver, wherein the controller determines a seventh strength of the second radio frequency signal received by the third receiver, wherein the controller determines an eighth strength of the second radio frequency signal received by the fourth receiver, and wherein the controller determines the second location of the object at the second time using the first distance, the second distance, the third distance, the fourth distance, the fifth distance, the sixth distance, the fifth strength, the sixth strength, the seventh strength, and the eighth strength of the second radio frequency signal.

9. The system of claim 4, wherein the first location and the second location form a line that is antiparallel with respect to a common plane formed by the first light fixture, the second light fixture, the third light fixture, and the fourth light fixture.

10. The system of claim 1, wherein the object initiates the first radio frequency signal.

11. The system of claim 1, wherein the first radio frequency signal is transmitted using Bluetooth low energy.

12. The system of claim 1, wherein the first radio frequency signal comprises an identification of the object.

13. The system of claim 1, wherein the controller is part of a network manager in communication with the first light fixture.

14. The system of claim 1, wherein the controller is part of the first light fixture.

15. The system of claim 1, wherein the second light fixture further comprises a transmitter, wherein the transmitter of the second light fixture sends information about the first radio frequency signal received by the second receiver to the first receiver of the first light fixture, wherein the information is used to determine the second strength of the first radio frequency signal received by the second receiver.

16. The system of claim 1, wherein the second light fixture further comprises a transmitter and a local controller, wherein the local controller determines the second strength of the first radio frequency signal, wherein the transmitter of the second light fixture sends information about the first radio frequency signal received by the second receiver to the first receiver of the first light fixture, wherein the information comprises the second strength of the first radio frequency signal received by the second receiver.

\* \* \* \* \*